United States Patent [19]

Klimek et al.

[11] 4,147,394

[45] Apr. 3, 1979

[54] VEHICLE BRAKE SYSTEM

[75] Inventors: Boleslaw M. Klimek, Des Plaines; Victor Mastis, Hinsdale, both of Ill.

[73] Assignee: The Echlin Manufacturing Company, Branford, Conn.

[21] Appl. No.: 810,116

[22] Filed: Jun. 27, 1977

Related U.S. Application Data

[63] Continuation of Ser. No. 660,141, Feb. 23, 1976, abandoned.

[51] Int. Cl.² .............................................. B60T 8/04
[52] U.S. Cl. ........................................ 303/118; 303/9
[58] Field of Search ................... 303/7, 28–30, 303/40, 84 A, 84 R, 100, 106, 115, 118; 137/627.5

[56] References Cited

U.S. PATENT DOCUMENTS

| | | | |
|---|---|---|---|
| 3,411,836 | 11/1968 | Dobrikin et al. | 303/40 |
| 3,862,782 | 1/1975 | Horowitz et al. | 303/40 |
| 3,869,177 | 3/1975 | Urban et al. | 303/118 |
| 3,920,045 | 11/1975 | Horowitz et al. | 303/29 X |
| 4,017,125 | 4/1977 | Durling | 303/7 |

Primary Examiner—Duane A. Reger
Attorney, Agent, or Firm—Neuman, Williams, Anderson & Olson

[57] ABSTRACT

A vehicle pneumatic brake system is disclosed wherein a transfer valve of advantageous design responsive to supply pressure is employed to provide service pressure to an anti-lock, pressure modulating valve for so long as supply pressure is greater than a preset minimum and to provide pressure from a protected reservoir (tank) to the anti-lock, pressure modulating valve when supply pressure is below such minimum value.

23 Claims, 6 Drawing Figures

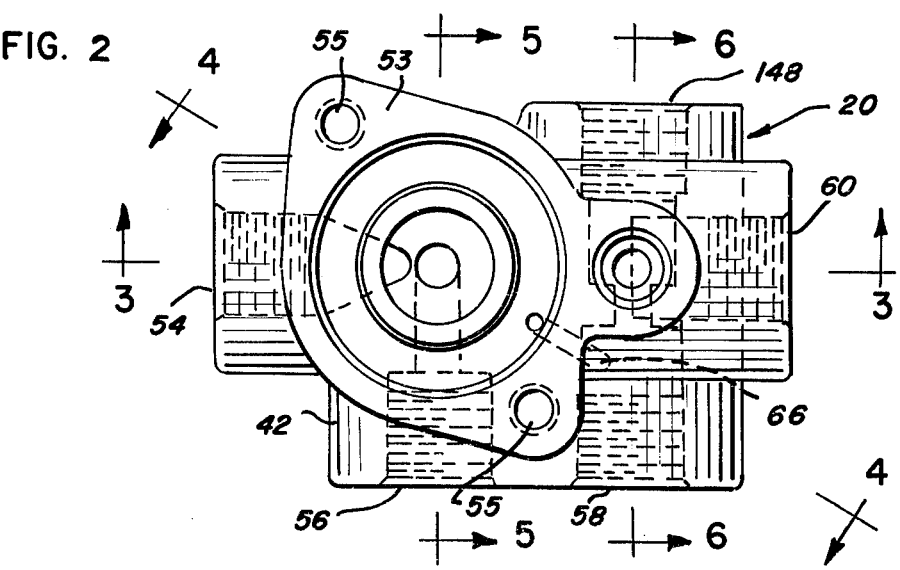
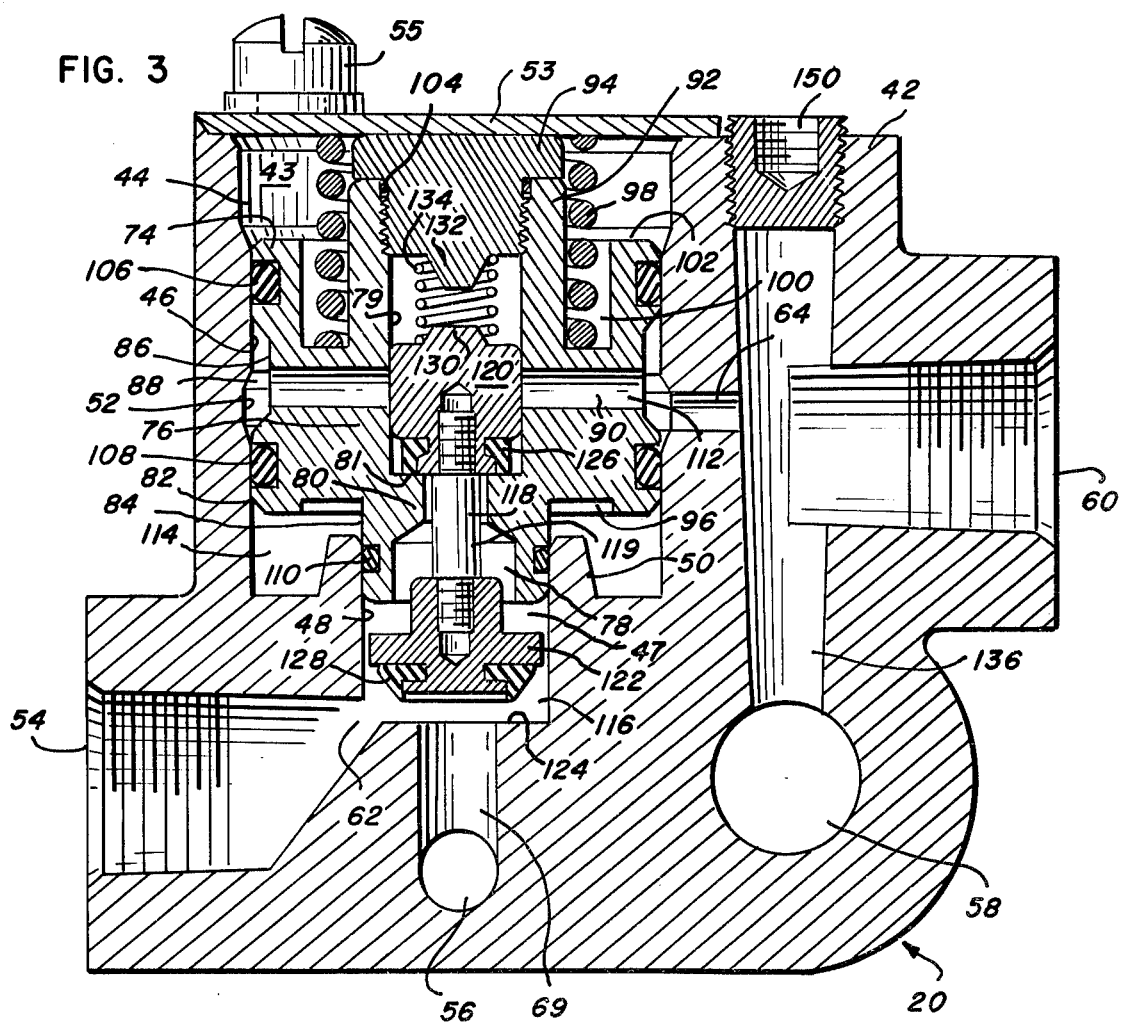

VEHICLE BRAKE SYSTEM

This is a continuation of application Ser. No. 660,141 filed Feb. 23, 1976 now abandoned.

BACKGROUND OF THE INVENTION

1. Field of the Invention

This invention relates to vehicle pneumatic brake systems such as are employed on large trucks and the like. More particularly, it relates to an improved brake system for maintaining vehicle stability by preventing under substantially all operating conditions wheel lock-up upon brake application and braking induced rotational vehicle movements, which may otherwise produce skidding and loss of lateral vehicle control.

2. Description of the Prior Art

Automatic control systems for vehicle pneumatic brakes have been designed with "anti-lock" or "anti-skid" features which, when pneumatic supply pressures are within certain limits, insure vehicle stability upon brake application. Some such prior art systems are shown in U.S. Pat. Nos. 2,937,052, 3,059,975, 3,439,958, 3,920,045.

In particular, a system is shown in U.S. Pat. No. 3,920,045, wherein an anti-lock, pressure modulating valve is combined with a modified relay valve. While supply pressure is within preset bounds (i.e., "normal"), the combined anti-lock/relay valve supplies braking pressure suitable for decelerating the vehicle and avoiding wheel lock. When, however, "normal" conditions do not obtain, i.e., supply pressure is less than the preset bounds, the anti-lock, pressure modulating valve is bypassed and braking pressure is supplied to the brakes by the modified relay valve. While this system has performed well, it would be desirable to provide a system wherein even under abnormal conditions the anti-lock, pressure modulating valve is maintained as a part of the braking control apparatus, thereby providing braking pressure to the brakes suitable for decelerating the vehicle while avoiding wheel lock-up.

OBJECTS OF THE INVENTION

Accordingly, it is an object of the present invention to provide an improved vehicle pneumatic brake system.

More specifically, it is an object of this invention to provide a vehicle pneumatic brake system wherein brake application, under substantially all operating conditions, is controlled by an anti-lock, pressure modulating valve.

It is another object of this invention to provide a vehicle pneumatic brake system having a supply pressure operated transfer valve which selectively delivers service or tank pressure to an anti-lock, pressure modulating valve of the system.

Other objects, advantages and capabilities of the present invention will become apparent as the description thereof proceeds.

SUMMARY OF ILLUSTRATIVE EMBODIMENT OF THE INVENTION

In a vehicle pneumatic braking system according to this invention, a supply pressure operated transfer valve of advantageous structure is employed to selectively provide either service pressure or pressure from a protected tank supply to an anti-lock, pressure modulating valve in response to the magnitude of the supply pressure. The anti-lock, pressure modulating valve modulates the service or tank pressure to supply braking pressure to the brakes of the vehicle effective to decelerate such vehicle while maintaining vehicle stability.

BRIEF DESCRIPTION OF THE DRAWINGS

For a more complete understanding of this invention, reference should now be had to the embodiment illustrated in greater detail in the accompanying drawings and described by way of an example of the invention. In the drawings:

FIG. 2 is a top plan view of the housing of the transfer valve indicated in block form in FIG. 1;

FIG. 3 is a sectional view, on a magnified scale, of the transfer valve indicated in block form in FIG. 1, along the line 3—3 of FIG. 2;

While the invention will be described in connection with a preferred embodiment, it will be understood that the invention is not limited thereto. On the contrary, it is intended to cover all alternatives, modifications and equivalents as may be included within the spirit and scope of the invention disclosed herein.

DETAILED DESCRIPTION OF THE DRAWINGS INCLUDING THE PREFERRED EMBODIMENT

Figure 1:
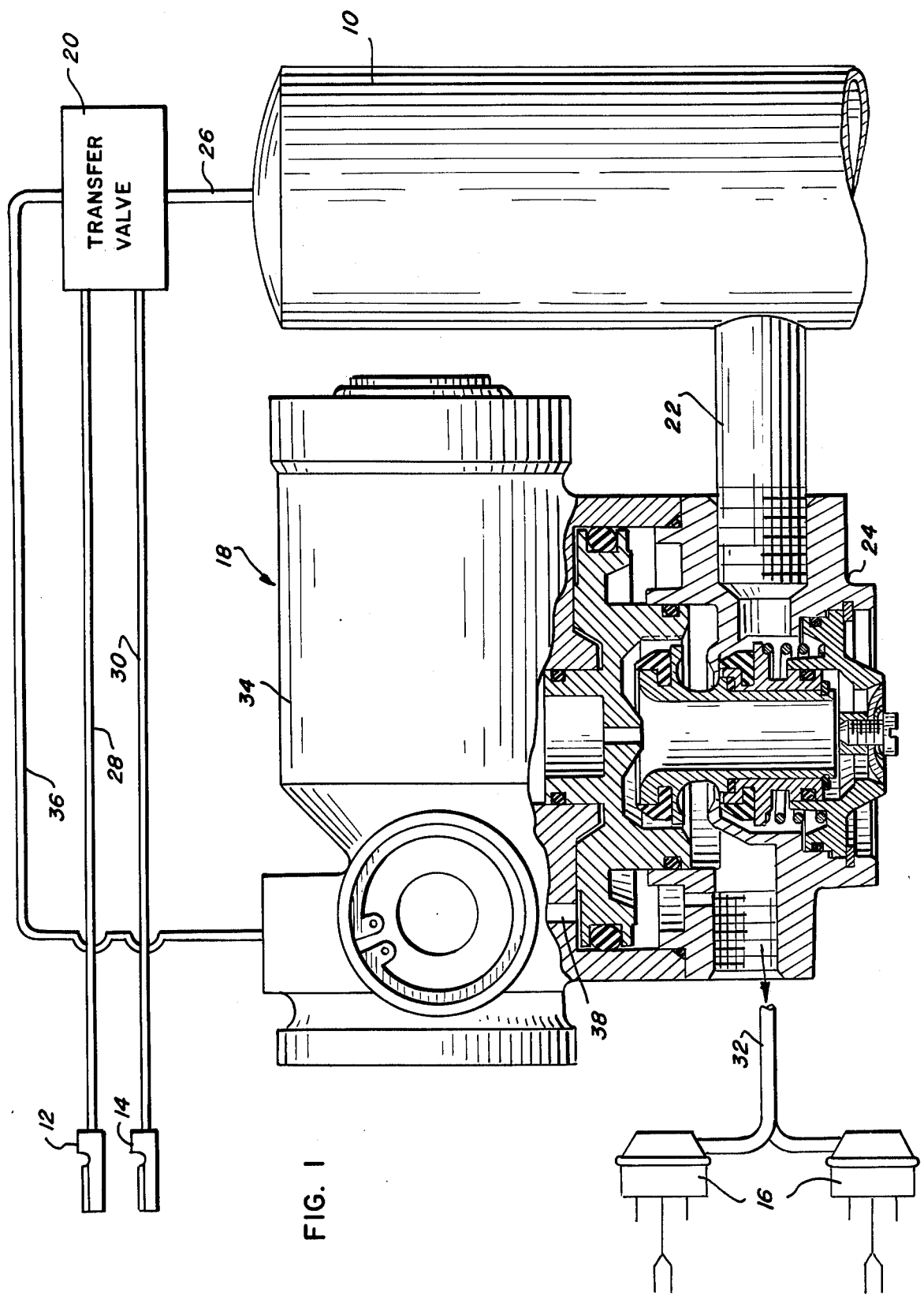
FIG. 1 is a schematic illustration of a vehicle pneumatic braking system employing principles of the present invention, with the novel transfer valve used therein being symbolically indicated in block form at the upper right and shown in detail in FIGS. 2-6, and including an axial sectional view of a prior-art pressure relay valve which may be advantageously employed in the system.

Referring now to the drawings, a pneumatic braking system utilizing principles of the invention is shown in FIG. 1. The brake system employs conventional elements including a fluid pressure reservoir or tank 10, service and supply gladhand connectors 12 and 14, brake actuators 16, and a combined anti-lock/relay valve 18, together with a transfer valve 20.

The tank 10 communicates by a conduit 22 with a pressure relay valve 24 of the combined anti-lock/relay valve 18 and by a conduit 26 with the transfer valve 20. The service and supply gladhand connectors 12 and 14 are connected to a foot pedal and an emergency or supply source, respectively, of the system (not shown). The service gladhand 12 communicates by a conduit 28 with the transfer valve 20. The supply gladhand 14 communicates by a conduit 30 with the transfer valve 20. The brake actuators 16 include service brake actuating chambers, and communicate by a conduit 32 with the relay valve 24 of the combined anti-lock/relay valve 18.

Anti-lock/relay valve 18 is similar in function to that disclosed in the aforementioned U.S. Pat. No. 3,920,045, which is incorporated herein by reference and thus will not be described in detail. Suffice to say that pressure relay valve 24 is substantially structurally identical to that disclosed in the patent except that relay valve 24 does not include the second piston disclosed in the patent, which is positioned within the housing, responsive to pressure at the supply port, and effective to cause the shuttle to open communication between the tank and brake delivery ports upon a drop in supply pressure.

The combined anti-lock/relay valve 18 or "CALM" valve (Controlling Air Logic Modulator) of the system performs a dual function, as is apparent to one skilled in the art to which this invention pertains. An anti-lock, pressure modulating valve 34 of the CALM valve 18 operates whenever braking pressure modulation is required to correct an overbraking condition. The anti-lock, pressure modulating valve 34 is a fluid control valve as is known in the prior art; it is responsive to commands from a controller (not shown) which is, in turn, coupled to sensing devices (not shown) for measuring vehicle dynamic characteristics including wheel speed. Braking pressure is communicated from the transfer valve 20 to the anti-lock, pressure modulating valve 34 by a conduit 36. The anti-lock, pressure modulating valve 34 modulates the braking pressure communicated therethrough in response to commands from the controller to prevent wheel lock-up. The modulated braking pressure from the anti-lock, pressure modulating valve 34 is communicated to the relay valve 24 by a conduit 38. The relay valve 24 is a valve to amplify fluid pressure as is known in the art. Braking pressure communicated from the transfer valve 20 to the anti-lock, pressure modulating valve 34 and modulated by the anti-lock, pressure modulating valve 34 is supplied through the conduit 38 to the relay valve 24 wherein it is amplified. The amplified braking pressure from the relay valve 24 is communicated to the brake actuators 16 by the conduit 32 to effectuate braking.

The transfer valve 20 is responsive to supply pressure received from the supply gladhand 14 by the conduit 30 to selectively deliver either service (signal) pressure from the service gladhand 12 or tank pressure from the tank 10 to the anti-lock, pressure modulating valve 34 of the CALM valve 18 by the conduit 36. More specifically, for so long as supply pressure is greater than a preset minimum (i.e., "normal"), service pressure from the service gladhand 12 is communicated by the transfer valve 20 to the anti-lock, pressure modulating valve 34. When supply pressure falls below such preset minimum (i.e., "abnormal"), tank pressure from the tank 10 is communicated by the transfer valve 20 to the anti-lock, pressure modulating valve 34. Thus, in substantially all operating conditions the anti-lock, pressure modulating valve 34 controls the braking pressure communicated to the service conduit 38 to effectuate braking, which prevents wheel-lock whether under normal or abnormal operating conditions.

In the interest of concise description, and since numerous tanks, gladhand connectors, service brake actuators, CALM valves and conduit arrangements are well known in the art and may be employed without departing from the nature and the scope of the invention, they are not described in greater detail herein.

Figure 4:
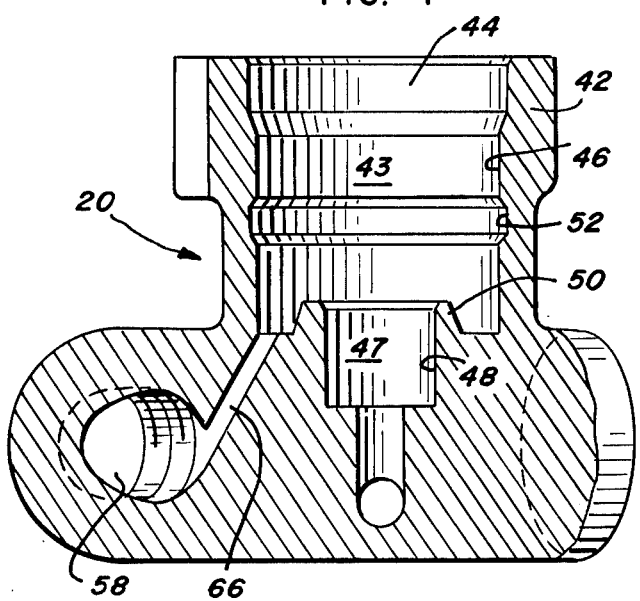
FIG. 4 is a sectional view on the same scale as FIG. 2 of the housing of the transfer valve of FIG. 2 along line 4—4.
Figure 5:
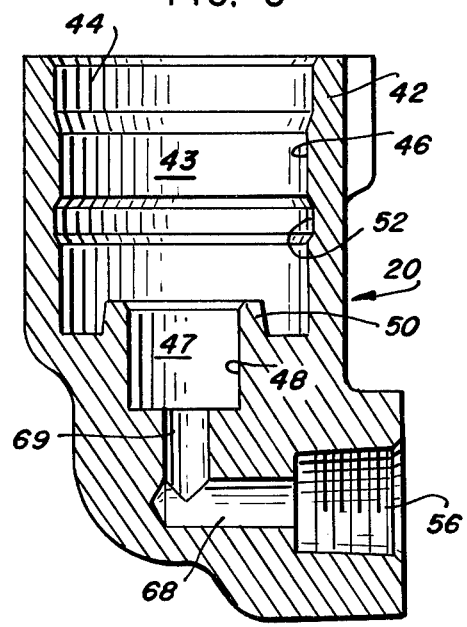
FIG. 5 is a sectional view on the same scale as FIG. 2 of the housing of the transfer valve of FIG. 2 along line 5—5.

Referring now to FIGS. 2-6, one embodiment of a transfer valve embodying principles of this invention is shown. As best seen in FIGS. 4 and 5, the transfer valve 20 has a housing 42. Within the housing 42 is a cavity 44 having a first portion 43 defined by a first wall 46 and a second portion 47 of lesser diameter defined by a second wall 48. The wall 48 includes an annular rib 50 protruding into the first portion 43 of cavity 44 and the wall 46 includes an annular depression 52. The cavity 44 is closed by a sealing end member 53, secured to the housing 42 by bolt members 55 (FIGS. 2 and 3).

The housing 42 has a delivery port 54, a service port 56, a supply port 58 and a tank port 60, connected to the conduits 36, 28, 30 and 26, respectively, of the system. The delivery port 54 is in communication with the cavity 44 by a passage 62 and the tank port 60 is in communication with the cavity 44 by a passage 64 (FIG. 3). The supply port 58 is in communication with the cavity 44 by a drill 66 (FIGS. 2 and 4). The service port 56 is in communication with the cavity 44 by a horizontal drill 68 and a vertical drill 69 (FIG. 5).

Reciprocal within the cavity 44, as best seen in FIG. 3, is a piston 74. The piston 74 comprises a generally cylindrical body 76 having a passage therethrough indicated at 78; an annular rib 80 including a valve seat 81 protrudes into the passage 78. The body 76 of the piston 74 has a first surface portion 82 and a second surface portion 84 of reduced diameter which slidably engage the first wall 46 and the second wall 48, respectively, and define the axis of movement of the piston 74. The surface portion 82 of the piston 74 includes an annular depression 86 which cooperates with the annular depression 52 in the first wall 46 of the cavity 44 to form an annular passage 88 for providing communication of fluid pressure about the piston 74. Pressure is communicated from the annular passage 88 to the passage 78 of the piston 74 by a radial drill 90 in the piston 74, perpendicular to the passage 78.

The piston 74 also includes an annular rib extension 92 tapped at its distal end to receive a threaded insert 94. The threaded insert 94 combines with the annular rib extension 92 of the piston 74 to form a limit stop engageable with the end member 53 of the cavity 44 to limit movement of the piston 74 upwardly as seen in FIG. 3. Similarly, the annular rib 50 of the housing 42 forms a limit stop engageable with an undersurface 96 of the piston 74 to limit movement of the piston downwardly as seen in FIG. 3. A helical, compression spring 98 engages the end member 53 and coaxially surrounds the annular rib extension 92 of the piston 74 and is seated in an annular groove 100 in a top surface 102 of the piston 74; the spring 98 biases the piston 74 away from the end member 53.

The piston 74 has sealing members 104, 106, 108 and 110. More specifically, sealing member 104 in the tapped annular rib extension 92 sealably engages the threaded insert 94. Sealing members 106 and 108 in the first surface portion 82 sealably engage the first wall 46 of the cavity 44. Sealing member 110 in the reduced diameter second surface portion 84 sealably engages the second wall 48 of the cavity 44. The sealing members cooperate with the piston and housing to define three chambers within the cavity 44. The first chamber 112 is in communication with the tank port 60 through the passage 64. The second chamber 114 is in communication with the supply port 58 through the drill 66 (not seen in FIG. 3). The third chamber 116 is in communication with the delivery port 54 through the passage 62 and with the service port 56 through the drills 68 and 69. The first and third chambers 112 and 116 are in communication through the passage 78 in the piston 74.

Also reciprocal within the cavity 44, as best seen in FIG. 3, is a shuttle or double-headed valve member 118. The shuttle 118 comprises an elongated rod portion 119 extending through the passage 78 of the piston 74, that is, through the annular rib 80 of the piston 74. Attached to one end of the rod portion 119 is a first valve head 120 captively held within the passage 78 of the piston 74 by the annular rib 80 and engageable with the valve seat 81. The first valve head 120 slidably but not sealingly engages a wall 79 of the passage 78 of the piston 74 such that the axis of movement of the shuttle 118 is substantially aligned with the axis of the piston 74. Attached to the distal end of the rod portion 119 is a second valve head 122 disposed to be engageable with a seat 124 surrounding the vertical drill 69 from the service port 56.

The first valve head 120 is effective to close communication through the passage 78 upon engagement of a sealing member 126 of the first valve head 120 with the seat 81. The second valve head 122 is effective to close communication between the service port 56 and the third chamber 116 through the drill 69 upon engagement of a sealing member 128 of the second valve head 122 with the seat 124. The first valve head member 120 has a buttress 130 which cooperates with a buttress 132 of the threaded insert 94 of the piston 74 to form a limit stop for limiting movement of the shuttle 118. A helical, compression spring 134 coaxially surrounds the buttress 130 of the first valve head 120 and the buttress 132 of the threaded insert 94 to urge the shuttle 118 downwardly as seen in FIG. 3, the axis of movement of the shuttle 118 being coaxial with the axis of the vertical drill 69.

Figure 6:
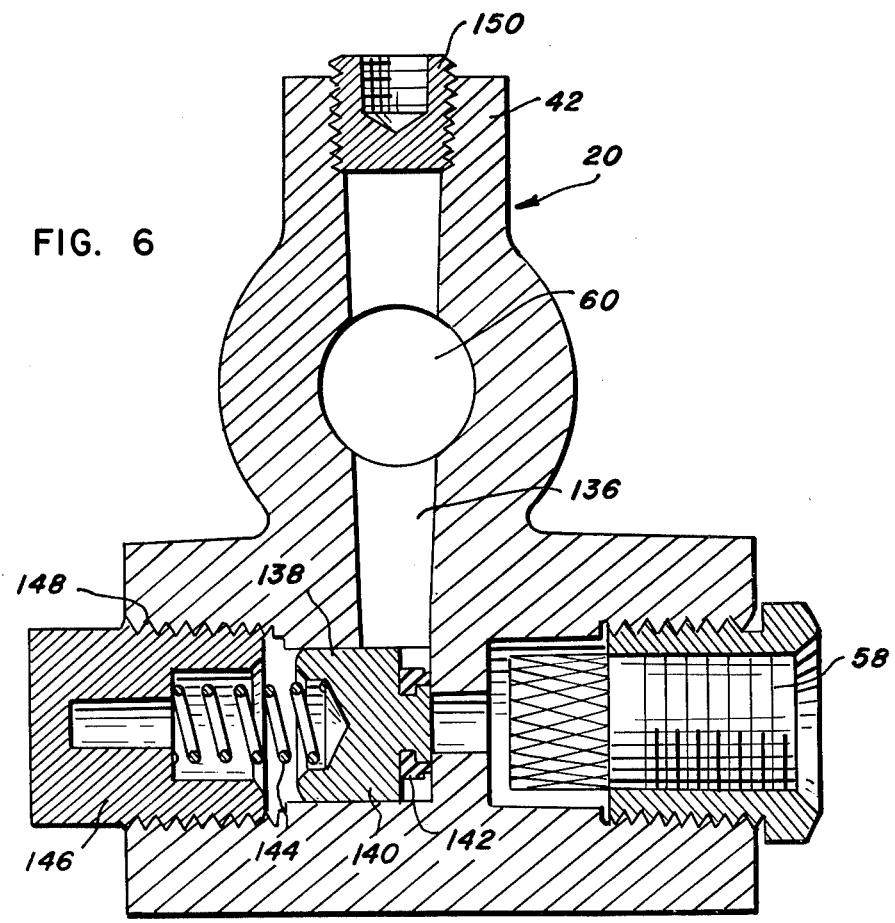
FIG. 6 is a sectional view on the same scale as FIG. 3 of the transfer valve indicated in block form in FIG. 1 along line 6—6 of FIG. 2.

As seen in FIG. 6, a passage 136 within the transfer valve 20 provides communication of pressure from the supply port 58 to the tank port 60; a check valve assembly 138 is provided in the passage 136 to prevent depletion of tank pressure upon a drop of supply pressure at the supply port 58. The check valve assembly 138 includes a piston 140 having a sealing member 142 normally biased to close the passage 136 by a compression spring 144 which engages a threaded insert 146 in an access port 148 (seen also in FIG. 2). It should be noted that the drill 66 providing communication between the supply port 58 and the second chamber 114 accesses the supply port 58 ahead of the check valve assembly 138 such that a drop in supply pressure at the supply port 58 is reflected in the second chamber 114.

While the tank 10 has been discussed as being connected to a side port 60 of the transfer valve 20 (as seen in FIG. 6), in an alternate embodiment of this invention the tank 10 is connected to a top port 150 (seen in FIGS. 3 and 6). Further, it is also contemplated by this invention that an independent source of supply pressure may be employed in place of the tank 10 described in the preferred embodiment.

The use and operation of the brake system of this invention is as follows:

The transfer valve of FIG. 3 is shown with the internal components as they are under "normal" circumstances, e.g., when there is adequate supply pressure on supply line 30. Pressure at the supply port 58 is communicated through the drill 66, FIG. 2, to the second chamber 114 and exerts force on the undersurface 96 of the piston 74, which force causes the piston to move against the force of the spring 98. This movement of the piston 74 causes the annular rib 80 of the piston to engage the first valve head 120 of the double-headed valve member 118, and with the first valve head 120 of the double-headed valve member 118 urged against the annular rib 80 by the spring 134, the sealing device 126 engages the valve seat 81 to close communication between the first chamber 112 and third chamber 116 through the passage 78 of the piston 74, that is, between the tank port 60 and delivery port 54.

Further movement of the piston 74 in response to the supply pressure causes concomitant movement of the first valve head 120, thereby displacing the double-headed valve member 118. This movement of the double-headed valve member 118 causes the sealing device 128 carried by the second valve head 122 of the double-headed valve member 118 to disengage the seat 124, opening communication from the service port 56 into the third chamber 116 through drills 68 and 69, that is, between the service port 56 and the delivery port 54 through the third chamber 116. Service pressure, i.e., brake signals, are freely transmitted by the transfer valve 20 from the service line 28 to the anti-lock, pressure modulating valve 34 and thus to the relay valve 24, causing tank pressure from tank 10 to be supplied to the brake chambers 16 to effectuate braking controlled by the anti-lock system.

Under abnormal circumstances, e.g., upon a drop in supply pressure in the second chamber 114, the piston 74, no longer acted upon by supply pressure, regresses under the force of the spring 98, causing the double-headed valve member 118 to regress concomitantly until the sealing device 128 carried by the second valve head 122 of the double-headed valve member 118 engages the seat 124, closing communication from the service port 56 into the third chamber 116 through the drill 69. Further movement of the piston 74 relative to the double-headed valve member 118 causes the annular rib 80 to disengage the first valve head 120, such that the sealing device 126 carried by the first valve head 120 disengages the valve seat 81, thereby opening communication between the first chamber 112 and third chamber 116, allowing communication between the tank port 60 and delivery port 54. Tank pressure from the tank 10 is supplied to the anti-lock, pressure modulating valve 34 by the transfer valve 20, causing tank pressure from the tank 10 to be supplied to the brake chambers 16 to effectuate braking controlled by the anti-lock system.

From the above description it is apparent that the objects of the present invention have been achieved. While only certain embodiments have been set forth, alternative embodiments and various modifications will be apparent from the above description to those skilled in the art. These alternate embodiments are considered equivalents and within the spirit and scope of the present invention.

Having described the invention, what is claimed is:

1. Vehicle pneumatic braking apparatus for use with sources of supply and service pressure, a tank for storing supply pressure and pneumatic actuator means for producing vehicle decelerating force, comprising:

first means adapted for connection to said sources of supply and service pressure, said tank and said pneumatic actuator means, for generating activating pressure for said actuator means; said first means including second means adapted for selecting pressure from said source of service pressure or from said tank in response to pressure from said source of supply pressure, and third means connected to said second means and responsive to pressure selected by said second means for generating such activating pressures as produce force to decelerate such vehicle with stability;

said second means comprising, a housing having first, second, and third ports therein, adapted for communicating with said sources of supply and service pressure and said tank, respectively, and a communication means, and piston means mounted within said housing for reciprocating movement therein between a first position and a second position in response to pressure appearing at said first port, said second port and said communication means being in communication when said piston means is in said first position;

said piston means comprising, a piston mounted within said housing for such reciprocating movement between said first position and said second position in response to pressure appearing at said first port, and a shuttle mounted within said piston for reciprocating movement with respect to said piston in response to movement of said piston, said piston including a first passage for providing communication between said communication means and said third port, said housing including a second passage for providing communication between said second port and said communication means, said shuttle including seal means for closing said first passage at least when said piston is in said first position and for closing said second passage at least when said piston is in said second position.

2. The apparatus of claim 1 wherein said third means comprises:
   an anti-lock, pressure modulating valve, connected to said communication means, for modulating pressure selected by said second means; and
   a relay valve, said relay valve connected to said anti-lock, pressure modulating valve, said tank and said actuator means, said relay valve communicating pressure from said tank to said actuator means responsive to pressure supplied to said relay valve by said anti-lock, pressure modulating valve; and said second means includes a passage for connecting said source of supply pressure and said tank for communicating supply pressure to said tank and valve means for selectively closing said passage to prevent depletion of supply pressure in said tank.

3. Pneumatic braking apparatus adapted for use with a source of anti-lock modulating signals comprising:
   ports for service pressure, supply pressure and stored supply pressure;
   an output port adapted for providing brake activating pressure;
   first means responsive to such anti-lock modulating signals for modulating the pressure at said output port, and
   second means responsive to pressure at said supply port for selectively providing communication between said service pressure port and said first means or between said stored supply pressure port and said first means;
   wherein said second means comprises a housing including said service pressure, supply pressure and stored supply pressure ports, communication means for providing communication between said second means and said first means, piston means mounted within said housing for reciprocating movement therein between a first position and a second position in response to pressure appearing at said supply pressure port, said service pressure port and said communication means being in communication when said piston means is in said first position, and slidable valve means mounted at least partially within said piston means and including means for closing communication between said service pressure port and said communication means and opening communication between said stored supply pressure port and said communication means when said piston means is in said second position.

4. The apparatus of claim 3 wherein said piston means comprises:
   a piston mounted within said housing for such reciprocating movement between said first position and said second position in response to pressure appearing at said supply pressure port; and
   said slidable valve means comprises a shuttle mounted at least partially within said piston for reciprocating movement therein; said piston including a first passage for providing communication between said stored supply pressure port and said communication means; said housing including a second passage for providing communication between said service pressure port and said communication means; said shuttle including seal means for closing said first passage at least when said piston is in said first position and for closing said second passage at least when said piston is in said second position.

5. The apparatus of claim 3 further comprising:
   a passage for providing communication between said supply pressure port and said stored supply pressure port; and
   valve means having sealing means for selectively closing said passage.

6. Pneumatic apparatus for use with sources of supply and service pressure, a tank for storing supply pressure, at least one pneumatic actuator means and anti-lock, pressure modulating valve means for providing modulated activating pressure for said actuator means, comprising:
   a housing having first, second, third and fourth ports, adapted respectively for connection to said sources of supply and service pressure, anti-lock, pressure modulating valve means and tank; and
   piston means mounted within said housing for reciprocating movement therein between a first position and a second position in response to supply pressure at said first port from such a source of supply pressure; said second port being in communication with said third port when said piston means is in said first position, thereby providing communication between such a source of service pressure and such an anti-lock, pressure modulating valve; said fourth port being in communication with said third port when said piston means is in said second position, thereby providing communication between such a tank and such an anti-lock, pressure modulating valve; said piston means including means for closing communication between said second port and said third port and opening communication between said fourth port and said third port when said piston means is in said second position;
   said piston means comprising, a piston mounted within said housing for reciprocating movement between said first position and said second position in response to pressure at said first port, and a movable shuttle mounted within said piston for reciprocating movement therein, said piston including a first passage for providing communication between said fourth port and said third port, said housing including a second passage for providing communication between said second port and said third port, said shuttle including seal means for closing said first passage at least when said piston is in said first position and for closing said second passage at least when said piston is in said second position.

7. The apparatus of claim 6 wherein said first passage in said piston comprises an axially aligned passage and a radial drill communicating with said axially aligned passage.

8. The apparatus of claim 7 further comprising an annular depression, in said housing for communicating pressure from said fourth port peripherally about said piston to access said radial drill.

9. The apparatus of claim 7 further comprising an annular depression in said piston for communicating pressure from said fourth port peripherally about said piston to access said radial drill.

10. The apparatus of claim 6 wherein said housing includes:
a passage between said first and said fourth port for communicating supply pressure from said source of supply pressure to said tank; and
valve means for selectively closing said passage to prevent depletion of said supply pressure stored in said tank.

11. Apparatus comprising:
a housing, including a cavity formed by walls therein and first, second, third and fourth ports; and
piston means mounted within said housing, said piston means cooperating with said walls forming said cavity to define at least a first and a second chamber within said cavity, said first chamber being in communication with said first port, and said second chamber being in communication with said second and third ports, said piston means mounted for reciprocal movement within said housing, responsive to pressure in said first chamber, between first and second positions, said piston means including shuttle valve means mounted at least partially within said piston means and movable within said piston means in response to movement of said piston means to selectively provide communication between said fourth port and said second chamber and to selectively terminate communication of said second port with said second chamber.

12. The apparatus of claim 11 wherein said housing comprises an annular depression disposed about said piston means and in communication with said fourth port for cooperatively operating with said means for selectively providing communication between said fourth port and said second chamber.

13. The apparatus of claim 11 wherein said piston means comprises a piston including an annular depression circumferentially about said piston for communication with said fourth port, and for cooperatively operating with said means for selectively providing communication between said fourth port and said second chamber.

14. The apparatus of claim 11 wherein said piston means comprises a piston including an axial passage therein and further including a radial passage communicating with said fourth port and said axial passage, said shuttle valve means being at least partially disposed within said axial passage.

15. The apparatus of claim 14 wherein said shuttle valve means includes a first seal means for selectively closing said axial passage in said piston.

16. The apparatus of claim 15 wherein said shuttle valve means further comprises second seal means for selectively engaging said housing about said second port to terminate communication of said second port with said second chamber.

17. The apparatus of claim 16 wherein said piston means further comprises spring means for urging said shuttle valve means to maintain said first seal means in a position closing said axial passage, said shuttle valve means being slidable within said axial passage in response to engagement to said second seal means with said housing to move said shuttle valve means in opposition to said spring means and open communication between said fourth port and said second chamber through said axial passage.

18. The apparatus of claim 17 wherein said second port communicates with said second chamber through a passage in said housing axially aligned with the axis of said piston.

19. The apparatus of claim 18 wherein said piston includes an annular depression disposed about its circumference in communication with said fourth port and said radial passage.

20. The apparatus of claim 11 wherein said piston means includes an annular rib extending from an end opposite said second chamber, and insert means for engaging said annular rib, said annular rib and said insert means combining to form a limit stop engageable with said housing to at least partially limit movement of said piston.

21. The apparatus of claim 11 wherein said piston means comprises a piston including an annular extension and a spring disposed about said annular extension and engaging said housing and said piston for urging said piston in opposition to force exerted on said piston by pressure in said first chamber.

22. The apparatus of claim 21 wherein said housing includes an annular guide member at least partially dividing said second chamber from said first chamber, said piston including an annular extension for slidably engaging said guide member, said extension including seal means for engaging said guide member.

23. Pneumatic apparatus comprising:
a housing, including a cavity formed by walls therein and first, second, third and fourth ports;
a piston mounted within said housing, said piston cooperating with said walls defining said cavity to define at least a first and a second chamber within said cavity, said first chamber being in communication with said first port and said second chamber being in communication with said second and third ports, said piston mounted for reciprocal movement within said housing responsive to pressure in said first chamber between first and second positions, said piston including an axial passage therein communicating with said second chamber, a radial passage therein communicating with said fourth port and said axial passage and an annular depression circumferentially about said piston for communication with said fourth port and for cooperatively operating with said axial passage and said radial passage to provide communication between said fourth port and said second chamber, said piston further including an annular rib extending from an end opposite of said second chamber and insert means for engaging said annular rib and combining with said annular rib to form a limit stop engageable with said housing to at least partially limit movement of said piston;

a shuttle at least partially disposed within said axial passage in said piston and slidable within said axial passage, said shuttle including first seal means for selectively closing said axial passage at least when said piston is in said first position and second seal means for selectively engaging said housing about said second chamber to terminate communication of said second port with said second chamber at least when said piston is in said second position;

a passage in said housing providing communication between said first port and said fourth port;

valve means having sealing means for selectively closing said passage between said first port and said fourth port;

first spring means disposed about said annular rib of said piston and engaging said housing and said piston for urging said piston in opposition to force exerted on said piston by pressure in said first chamber; and second spring means for urging said shuttle to maintain said first seal means in a position closing said axial passage and said second seal means in a position engaging said housing.

* * * * *